J. L. KNIGHT & S. SMITH.
Adjustable Wash Bowl.
No. 9,500. Reissued Dec. 14, 1880.
FIG. 2.
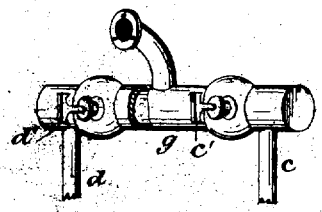
FIG. 3.
FIG. 1.
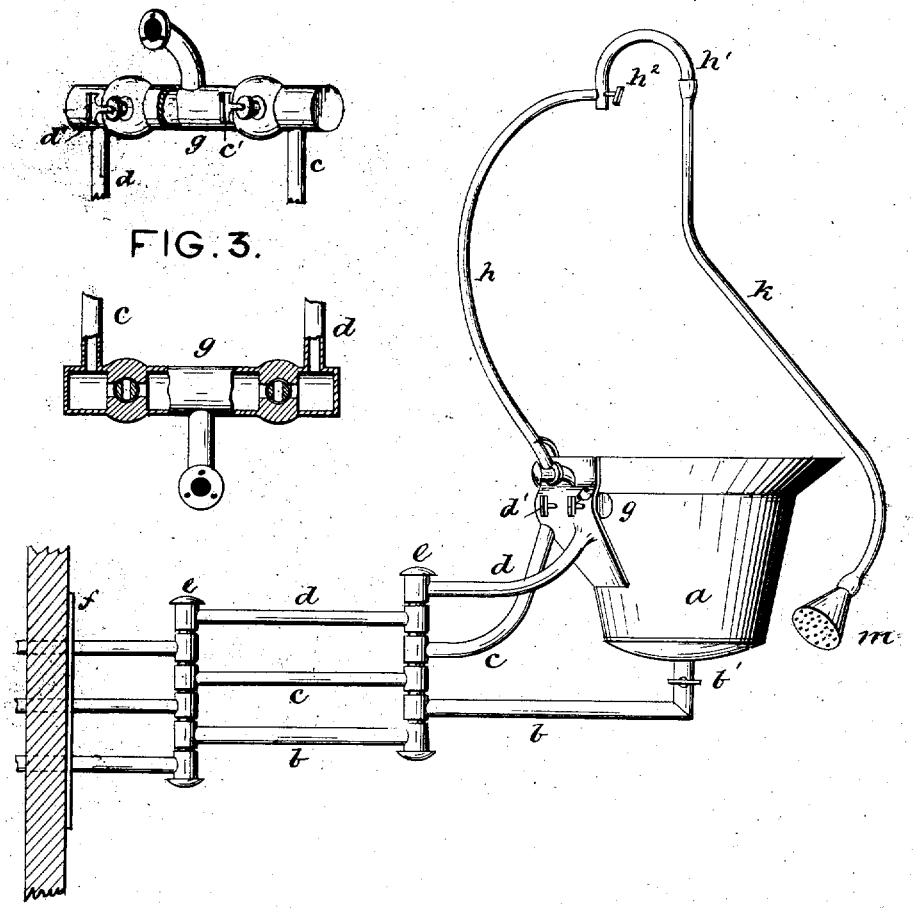
Witnesses:
M. M. Lacey
J. B. Holderby
Inventor
J. Lee Knight
Scott Smith
R. S. & A. Lacey Att'ys.

UNITED STATES PATENT OFFICE.

J. LEE KNIGHT AND SCOTT SMITH, OF TOPEKA, KANSAS.

ADJUSTABLE WASH-BOWL.

SPECIFICATION forming part of Reissued Letters Patent No. 9,500, dated December 14, 1880.

Original No. 220,156, dated September 30, 1879; Reissue No. 9,355, dated August 24, 1880. Application for reissue filed September 29, 1880.

*To all whom it may concern:*

Be it known that we, J. LEE KNIGHT and SCOTT SMITH, citizens of the United States, and resident at Topeka, in the county of Shawnee and State of Kansas, have invented certain new and useful Improvements in Adjustable Wash-Bowls; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention has for its object to furnish an adjustable wash-bowl, adapted particularly for barbers' use.

It consists, substantially, of a bowl supported at a suitable distance above the floor, and so connected to the wall that it may be turned outward to the side of the barber's chair, and in having the said bowl provided with hot and cold water supply pipes, a discharge or waste pipe, and a delivery-pipe with hose and sprinkler, the several pipes being provided with cut-offs, as will be hereinafter fully explained.

In the drawings, Figure 1 shows a bowl with the several pipes connected thereto according to our invention. Figs. 2 and 3 are detailed views, showing the connections of the hot and cold water pipes and the delivery-pipe.

*a* is the wash-bowl, which has in its bottom a waste-opening, to which is attached a waste-pipe, *b*, so arranged as to permit the bowl to be moved to or from the wall without interfering with the flow of water through said waste-pipe.

The waste-pipe may be provided with a stop-cock, *b'*; or, in lieu of the stop-cock, a plug of ordinary form may be employed and inserted in the opening in the bottom of the bowl.

*c* and *d* are hot and cold water supply pipes, made of suitable material, and so arranged as to carry the water from the service pipes or reservoirs to the tempering-chamber *g* on the side of the bowl *a*, whether the bowl be folded back against the wall or drawn out to any point within the radius of its supporting-arm.

The inner ends of the water-pipes *c d* are connected with the hot and cold water service pipes of the building, or with convenient reservoirs, and the outer ends are connected with the tempering-chamber *g*.

The waste-pipe *b*, opening from the bottom of the bowl *a* at its outer end, is connected at its inner end with the discharge or sewer pipe or receptacle for waste water.

The confluent or tempering chamber *g*, which is attached to the side of the bowl *a*, has connection at either end, respectively, with the supply-pipes *c* and *d*, the flow of the water from either pipe being regulated by stop-cocks *c' d'*.

The supporting-arms may consist of any desired number of sections and joints; but for ordinary purposes three sections and two joints, *e e*, will be found sufficient.

From the portion of the tempering-chamber *g* between the stop-cocks *c'* and *d'*, a stand-pipe, *h*, extends upward above the bowl *a*, so as to give ample space between the upper end *h'* and the said bowl *a* for a man's head. The pipe *h* is provided with a stop-cock, $h^2$, to regulate the flow of water.

Attached detachably to the end *h'* of the vertical stand-pipe *h* is a section of hose, *k*, having a sprinkler, *m*, attached detachably to its outer end.

Instead of, or in addition to, the stand-pipe *h*, arranged as described, a spigot can be employed to run the water directly from the chamber *g* into the bowl *a*. The washing could then be done, in the usual way, from the water in the bowl, and after use, by opening the stop-cock in the waste-pipe *b*, or withdrawing the plug in the bottom of bowl, the waste water carried away in same manner, as heretofore described.

When not in use the bowl is folded or swung back against the wall *f*, where it will be out of the way.

The special use for which this adjustable wash-bowl is designed and adapted is shampooing, the object to be accomplished being to complete the operation without the person being operated on getting out of the barber's chair.

The bowl, by means of its adjustable supports, can be extended in front of or to the side of the chair. The person, by leaning forward or to one side, will bring the bowl directly under his head, after which the barber, having at hand either hot or cold water, (or any desired temperature, by means of the stop-cocks opening into the chamber *g*,) can complete the washing, and, by means of the stand-pipe *h* and hose *k*, apply the water at any point desired.

The stand-pipe *h* is so attached to the bowl that it may be turned down at the side of the bowl when not in use, and by this means render the device more compact.

It will readily be understood that this bowl, constructed as herein described, but omitting the stand-pipe *h* and hose *k*, would serve as a cheap adjustable wash-bowl for bed-rooms, hospitals, factories, and other places where rigid wash-stands would be objectionable on account of the space they would necessarily occupy.

By this bowl all modern conveniences are supplied, while, when not in use, it can be compactly adjusted in a limited space without in the least disturbing or interfering with its connections for water-supply and sewage.

Having thus described our invention, what we claim, and desire to secure by Letters Patent, is—

1. In an adjustable wash-bowl, hot and cold water supply pipes and a waste-pipe made in sections and hinged or jointed together, so that they will fold together or unfold, and thereby set the bowl to or from its point of support, substantially as set forth.

2. The combination, with the bowl *a*, having hot and cold water supply pipes connected therewith and adjustable to and from its point of support, of the stand-pipe or stem *h*, supported on the bowl and adjustable therewith, and connected with the supply-pipes, and provided with suitable stop-cocks and sprinkler attachment *k*, substantially as set forth.

3. In a wash-bowl adjustable to and from its point of support, and provided with a supply-pipe, the stand-pipe or stem *h*, connected to the supply-pipe and provided with a suitable cut-off for regulating or shutting off the stream of water, and adapted to carry a sprinkling device, *k*, substantially as set forth.

4. The combination, with the bowl *a*, adjustable to and from its point of support, and having hot and cold water supply pipes connected thereto, of a confluent or tempering chamber, substantially as set forth.

5. The combination, with a wash-bowl having hot and cold water supply pipes, of a tempering or confluent chamber affixed to its side and connected with the supply-pipes, and having a lateral discharge port or ports for conveying the water into the bowl and a vertical discharge-port for conveying the water into the sprinkler, substantially as set forth.

6. A wash-bowl provided with a jointed or folding supply-pipe and with a jointed or folding waste-pipe, and connected to and supported on said pipes so that it can be adjusted outward or inward and set at different distances from its point of support, substantially as set forth.

7. A wash-bowl provided with hot and cold water supply pipes, the said pipes being formed so that they will fold together and permit the bowl to be adjusted outward or inward and set at different distances from the point of connection of the supply-pipes with the service-pipes, substantially as set forth.

8. A wash-bowl having attached thereto a folding supply-pipe, in combination with means whereby it is adjustable to different distances to and from the point of connection of said supply-pipe with the service-pipe, substantially as set forth.

9. A wash-bowl having attached thereto a folding supply-pipe and a folding waste-pipe, in combination with means whereby it is adjustable to different distances to and from the point of attachment of said supply and waste pipes to the service and discharge pipes, substantially as set forth.

In testimony that we claim the foregoing we have hereunto set our hands this 20th day of September, 1880.

J. LEE KNIGHT.
SCOTT SMITH.

Witnesses:
JOHN MACDONALD,
C. THOMAS, Jr.